United States Patent
Mitchell (10) Patent No.: US 7,283,542 B2
(45) Date of Patent: Oct. 16, 2007

(54) NETWORK ADDRESS TRANSLATOR AND SECURE TRANSFER DEVICE FOR INTERFACING NETWORKS

(75) Inventor: Julian Mitchell, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1039 days.

(21) Appl. No.: 10/298,103

(22) Filed: Nov. 15, 2002

(65) Prior Publication Data

US 2004/0095944 A1    May 20, 2004

(51) Int. Cl.
*H04L 12/66* (2006.01)
*H04L 12/28* (2006.01)
*G06F 9/00* (2006.01)

(52) U.S. Cl. ............... 370/401; 370/352; 370/389; 726/12; 726/13; 726/14

(58) Field of Classification Search ............... 370/352, 370/389, 351, 392, 353; 713/153, 151, 162; 709/224, 223, 225; 726/13, 14, 15
See application file for complete search history.

(56) References Cited

U.S. PATENT DOCUMENTS

| | | | |
|---|---|---|---|
| 6,507,908 B1 * | 1/2003 | Caronni ..................... | 713/153 |
| 6,674,758 B2 * | 1/2004 | Watson ...................... | 370/401 |
| 7,061,899 B2 * | 6/2006 | Walker et al. ............. | 370/351 |
| 7,099,319 B2 * | 8/2006 | Boden et al. .............. | 370/389 |

* cited by examiner

*Primary Examiner*—Hanh Nguyen
(74) *Attorney, Agent, or Firm*—Barnes & Thornburg LLP

(57) ABSTRACT

An interface for a private IP network interfaces flows of packets between gateway controllers and external media gateways. It has a network address translator and an IPsec device for maintaining secure paths to the external devices. A path identifier records which of the packet flows corresponds to which path. It is incorporated in the packet header, and means that the same interface can be used to couple many different external gateways, and interface them with many of the gateway controllers. Widespread deployment of such interfaces in anonymisers to achieve hiding of device addresses and network topology, as well as the reduction in use of expensive registered addresses is facilitated. By sending the path identifier in the packet, the IPsec device and the address translator can be loosely coupled devices, so standard readily available devices can be used.

13 Claims, 6 Drawing Sheets

CONVENTIONAL SIGNALLING PACKET HEADER FIELDS
AT VARIOUS POINTS ALONG PATH FROM MGW TO GWC

FIG 2, CONVENTIONAL SIGNALLING PACKET HEADER FIELDS AT VARIOUS POINTS ALONG PATH FROM MGW TO GWC

FIG 4, SIGNALLING PACKET HEADER FIELDS AT VARIOUS POINTS ALONG PATH FROM MGW TO GWC

FIG 5, RETURNING PACKET HEADER FIELDS AT VARIOUS POINTS ALONG PATH FROM MGW TO GWC

FIG 6, OVERVIEW OF SOME ANONYMISER FUNCTIONS

NETWORK ADDRESS TRANSLATOR AND SECURE TRANSFER DEVICE FOR INTERFACING NETWORKS

FIELD OF THE INVENTION

This invention relates to interfaces for networks, to anonymisers for such networks, to networks having such interfaces, to methods of offering a communication service over such apparatus to methods of using such as service, and to corresponding data structures.

BACKGROUND TO THE INVENTION

A known category of anonymiser (a device for hiding addresses of devices in a network behind the anonymiser) for communications applications, is a Network Address Translator (NAT), typically used for hiding addresses. It can be located at an interface between a private network having devices with unregistered IP addresses, and a public or global IP network. Different networks typically each use a particular addressing scheme and number of addresses, one for each node within that network. Thus each network is an address domain, which may or may not overlap with other domains. An address domain may be either public or private with respect to other address domains. For example, an enterprise network can be private with respect to a public network, so that addresses of nodes within enterprise network are not revealed to nodes of the public network. However, addresses of nodes in the public network are available to nodes within the enterprise network.

Without the address hiding provided by NAT, devices on the internal network could be sent packets from unwanted sources. This could leave such devices exposed to spoofing, interception, hacking or denial of service attacks, and so on. Also, the NAT enables a limited number of registered IP addresses to be used, which can save the costs of registering many IP addresses. NATs are also useful to avoid address renumbering in a private network to respond to circumstances such as changing Service Providers, company backbones being reorganized, or Service Providers merging or splitting. NATs are described in Internet Engineering Task Force (IETF) request for comments (RFC) 3022 and 2663.

NATs are typically implemented in the form of software running on conventional hardware, e.g. general purpose processors or DSPs (digital signal processors) or application specific integrated circuits, or firmware. The software is typically written in a conventional language such as C or C++. They are arranged to first read the headers of the packets sent by the devices. The source IP address is altered to a substitute value. The old and new substitute values are stored in a look up table. When a reply packet is received, the NAT value reads the destination IP address field. If it corresponds to a stored substitute value, the NAT uses the look up table to find the original correct IP address. The NAT changes the destination IP address field to the correct address and forwards the packet into the private network to be routed to the destination device. In other words, the NATs use packets flowing from the inside (private network) to the outside (public network), to create a NAT bind and to maintain the NAT bind. NAT binds are specific to a single source address (and sometimes port). This means that in order to create a NAT bind the actual device which will use the bind has to send data packets. These binds are maintained even if the source device is not sending data packets continuously, as in the case of a voice over Internet Protocol (VoIP) gateway with silence suppression and no comfort noise packets, or with one way speech path, or which is on hold.

NATs can use Basic Network Address Translation or Basic NAT, which is a method by which IP addresses are mapped from one group to another, transparent to end users. There is also Network Address Port Translation, or NAPT, which is a method by which many network addresses and their Transmission Control Protocol/User Datagram Protocol (TCP/UDP) ports are translated into a single network address and its TCP/UDP ports. The term "traditional NAT" refers to both these. Unless mentioned otherwise, the term NAT, as used in this specification, will mean traditional NAT, and to the devices performing these functions, Network Address Translators, and Network Address and Port Translators.

One important service which is provided over such networks is VoIP. This is typically achieved using a control node which is part of a service provider's own network, connected to a public network via an address translation function such as a NAT. This involves call set up processes including sending signalling packets using several different protocols to set up a call path in each direction between the source and destination entities. Once the call has been set up, actual media packets can be sent between the two entities to carry out the call. Media gateways are used to allow user terminals or endpoints to access a packet-based network. For example, the media gateways each comprise a codec which is used to convert speech signals into digitised, packetised data suitable for transmission over the enterprise packet data network.

SUMMARY OF THE INVENTION

It is an object of the present invention to provide improved apparatus and methods. According to a first aspect of the present invention, there is provided an interface for a network, for interfacing flows of packets between addressable devices in the network and external devices, the interface having an address translator coupled to the addressable devices for translating addresses of the packets flowing to and from the addressable devices, a secure transfer device coupled to the address translator for maintaining secure paths for each of the flows to and from the external devices, the interface being arranged to maintain a record which of the secure paths corresponds to which of the packet flows.

An advantage of maintaining such a record, rather than having the NAT throw away the source and destination port field information which shows which secure path was used, is that the same interface can be used to couple many different external devices, and interface them with many of the gateways. The interface then need not be tied to a particular gateway. Particularly where there are many hundreds or thousands of gateways in the networks, the widespread deployment of such interfaces in anonymisers or other applications, to achieve the advantages of hiding of device addresses and network topology, as well as the reduction of numbers of registered addresses will be commercially significant.

As an additional feature some embodiments are further arranged to send an identifier of the path between the translator and the secure transfer device with the packets.

An advantage of sending the identifier is that the secure transfer device and the address translator can be independent, or loosely coupled, devices. This means that standard readily available devices can be used for these functions. This can enable development costs and delays to be reduced.

An additional feature of some embodiments is the packets being IP packets.

An additional feature of some embodiments is the secure path using UDP (Universal Datagram Protocol) encapsulation of IPsec packets. This follows standards defined by the IETF, which include a tunnel mode and a transport mode, though transport mode is preferred. This has advantages of being widely known, tested and approved for IP networks, so will not be as expensive to develop as other options. UDP is a protocol that sends independent packets of data, called datagrams, from one computer to another with no guarantees about arrival. UDP is not connection-based like TCP (transmission control protocol).

An additional feature of some embodiments is the identifier being within the packets. This can help to facilitate the use of standard devices, needing a minimum of development, compared to the option of sending the identifier separately to the packets.

An additional feature of some embodiments is the identifier being within a header of the packets. Again this can help facilitate the use of standard devices.

An additional feature of some embodiments is the identifier being within a source port address field. This is convenient because other fields of the I.P. header are used for other purposes. An additional feature of some embodiments is the identifier being included in return packets arriving at the secure transfer device.

An additional feature of some embodiments is the identifier being within the source port address field of the return packets. An advantage of this is that the destination port address field is left free for use in identifying the protocol used by the flow of packets. This is worthwhile even though it complicates the address translator, since it can no longer be symmetrical, and thus will need a different look up table for each direction of the flows.

An additional feature of some embodiments is the secure transfer device being arranged to handle flows having different protocols, and to send an indication of the protocol for each flow. This capability is one advantage of some devices, and is particularly useful for services such as VoIP, which use several protocols for signaling.

An additional feature of some embodiments is the address translator being a twice NAT device. This implies a device able to handle translations in both directions, therefore having the advantage of being suitable for maintaining address hiding in both directions, and thus being suitable for coupling devices which are both in private networks. An additional feature of some embodiments is the twice NAT device having separate look up tables for flows in each direction. This has the advantage of enabling asymmetrical operation, for more flexibility, for example enabling the source port address to be used for the identifier.

An additional feature of some embodiments is the interface being software. This acknowledges that software can be a valuable, separately tradable commodity. It is intended to encompass software which runs on or controls "dumb" or standard hardware, to carry out the desired functions, (and therefore the software essentially defines the functions of the interface, and can therefore be termed an interface, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect of the invention provides an anonymiser for hiding network addresses, having the interface. This is one application for the interface, it can also be used in any application in which the identifier needs to be passed to or from the secure transfer device.

Another aspect of the invention provides a network having a number of separately addressable devices, and an interface to other networks, and having the interface, arranged to hide the addresses from the other networks.

Another aspect of the invention provides a method of offering a communications service using a network having the interface. As the advantages of the invention can enable a better system or network, which is more reliable or more flexible, or greater capacity, or more cost effective for example, consequently this can be reflected in a correspondingly improved service over the network, and hence the value of such services can increase. Such increased value over the life of the system, could prove far greater than the sales value of the equipment.

An additional feature of some embodiments is the communications service being a voice over IP service.

An additional feature of some embodiments is the network being a service providers network, and the addressable devices being gateway controllers arranged for setting up a VoIP call between the external devices.

Another aspect of the invention provides a method of using the communications service. This is claimed in case it proves more valuable than the apparatus or in case the user is in jurisdiction, but the apparatus is not.

Another aspect of the invention provides a data structure in the form of an IP packet having a header, the header having a source port address field, the source port address field having data identifying a secure path.

Another aspect of the invention provides a data structure in the form of a look up table for translating a header of an IP packet, the header having a source port address field, the translation being to include or remove data identifying a secure path associated with the packet, to or from the source port address field.

Any of the additional features can be combined with any other of the additional features or aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
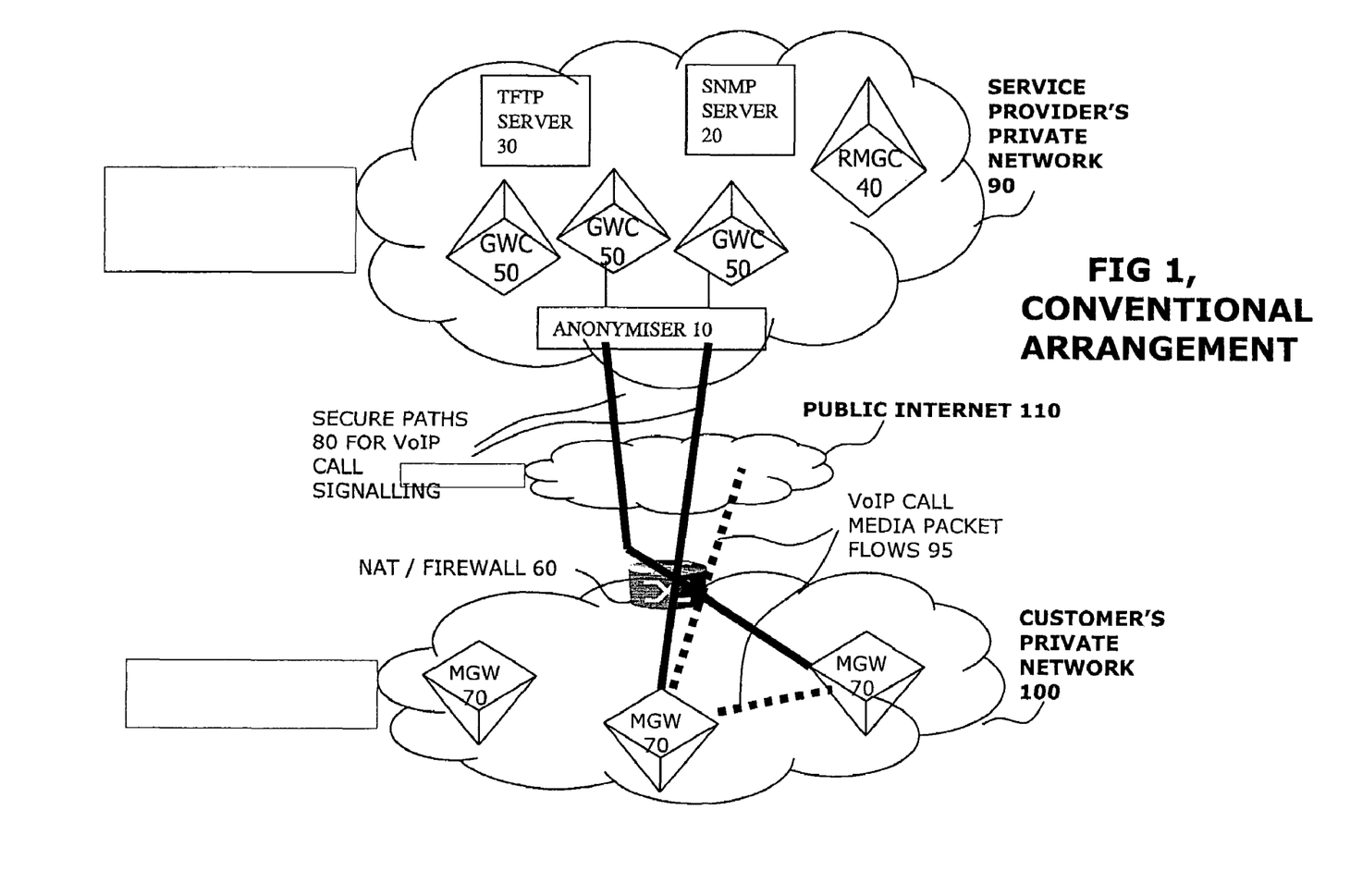
FIG. 1 shows conventional interconnected networks in which the interface of the invention can be applied.

FIG. 1 Conventional Interconnected Networks with Anonymiser

FIG. 1 shows how an anonymiser 10 is typically deployed. It acts an interface between a service provider's private network 90 and a customer's private network 100, which are linked over the public internet 110. Devices in the service provider's private network include a TFTP (Trivial File Transfer Protocol, defined in IETF RFC 1350) device 30, an SNMP server (Simple Network Manager Protocol, defined in IETF RFC 1157) device 20, and an RMGC (Redirecting Media Gateway Controller) device 40. The purpose of the latter is to receive all initial registration requests from gateways, to determine the actual GWC (Gateway Controller) 50 which will handle this gateway and to send a redirect message back to the gateway with information to allow it to register with the correct GWC. The service provider's private network also includes a number of gateway controllers (GWC) 50 for controlling communication services provided by the service provider. For example, voice over I.P. (VoIP) calls can be set up by the GWCs. The GWCs communicate with media gateways (MGWs) 70 in the customer's private network. The customer's private network includes an NAT/firewall 60 at the interface to the public internet. Since setting up a VoIP call involves several different protocols, some of which are incompatible with the NAT, secure paths 80 are set up between the anonymiser and the MGW. These enable the protocols to get through the NAT, and can give enhanced security for these signalling communications. When the VoIP call is set up, the flows of media packets 95 can pass directly from source to destination either within the customer's private network 100 or over the public internet 110. The packet headers for the flows of signalling packets from the MGW to the GWC will now be described in more detail.

Figure 2:
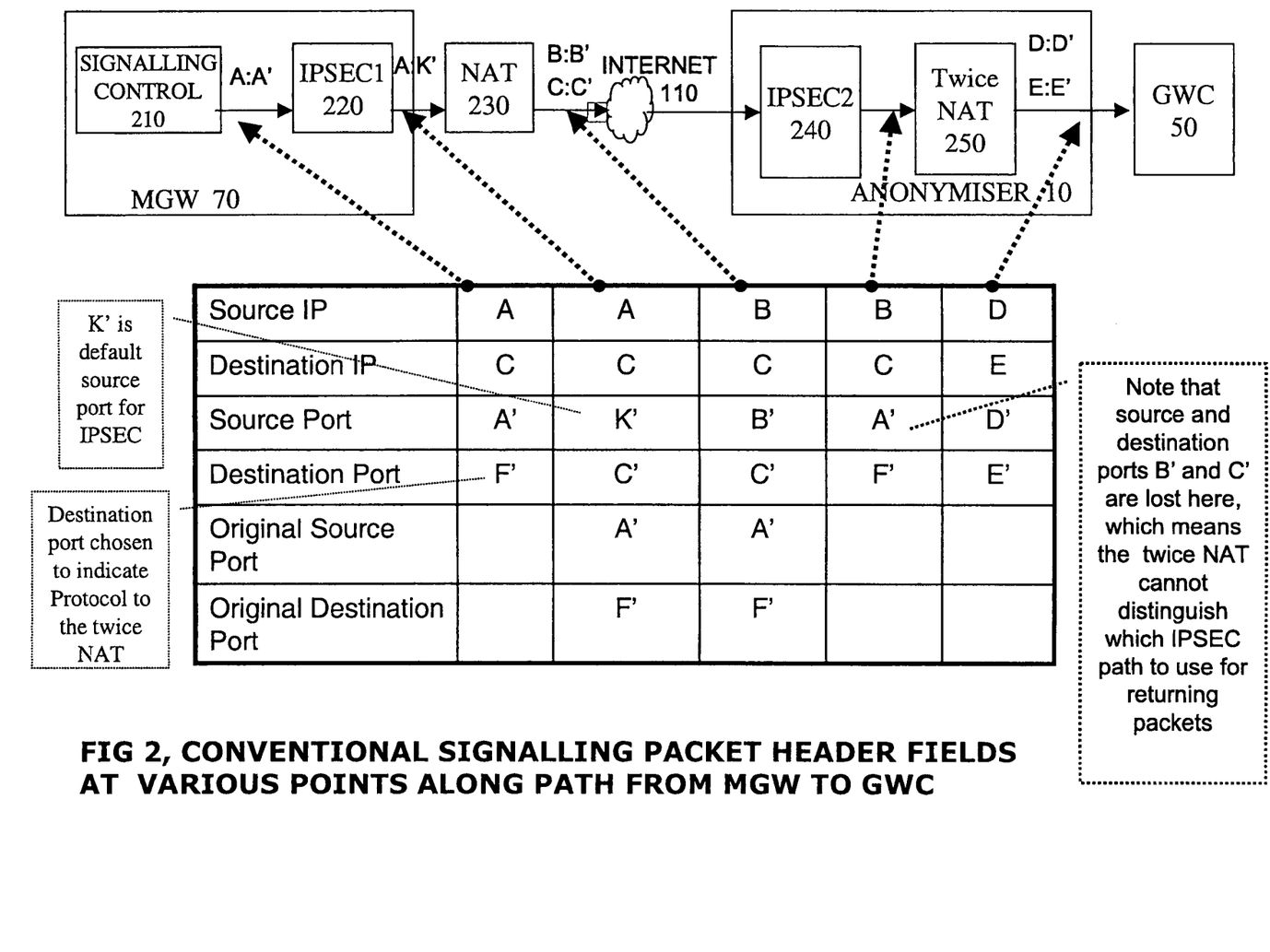
FIG. 2 shows conventional signalling packet header fields at various points along a path between networks.

FIG. 2, Conventional Signalling Packet Header Fields

FIG. 2 shows a typical path for a signalling packet, and a table showing how the packet header fields are changed at various points along the path from the MGW and GWC. The MGW 70 includes a signalling control part 210 and a secure transfer device in the form of an IPSEC compatible module, IPSEC 1, 220. The MGW receives data or analogue signals indicating a VoIP call is commencing, to a given destination. The signalling control part creates appropriate signalling packets, typically IP packets, for alerting a GWC. A number of different signalling processes are carried out, involving packet flows from the MGW to and from various servers at the GWC end. For each process, the IPSEC device creates a secure path to a corresponding IPSEC device 240 at the anonymiser 10. The IPSEC devices communicate periodically to maintain separate paths for separate flows, even when there is no traffic to carry. Keep alive packets can be sent for this purpose. Encryption and other security measures are also implemented according to the IPSEC standard. IPSEC over UDP has a transport mode and a tunnel mode defined in an Internet Draft (draft-ietf-ipsec-udp-encaps-03.txt) maintained by the IETF, the transport mode is preferred, and is the mode illustrated. The path from IPSEC 1 passes via the NAT 230 and the internet 110 to the IPSEC 2 within the private network of the service provider. It continues to the twice NAT, 250, within the anonymiser, and from there to the GWC 50.

As shown in the figure, the header fields change at various points along this path. The NAT changes the source IP address from A to B. The IPSEC 1 changes the destination port and the source port and stores the original source and original destination ports in the header. The destination port field is chosen to indicate the signalling protocol for this flow. This is used by the twice NAT and by the IPSEC 2 in the anonymiser. The destination IP address remains unchanged until is reaches the twice NAT. At the IPSEC 2 device, the original source and destination port fields are restored. However, this means the source port information K' and the destination port C' which refer to input and output ports of the IPsec devices, are lost at the output of the IPSEC 2 device. This means the twice NAT device and other devices downstream along the path cannot identify which path of many set up between the IPsec devices has been used by a given packet.

The twice NAT needs such information because it stores a record of its address translation so that a corresponding reverse address translation can be applied to returning packets of a given flow. Without the path identifier, the secure transfer device IPSEC 2 would be unable to determine which path to use for a given returning packet. This would not matter if there were only one destination. In other words each separately addressable server could have its own dedicated anonymiser. However, this becomes impractical with widespread deployment of many GWCs necessary for handling large volumes of VoIP traffic for example. Another possibility is to combine the IPSEC and the twice NAT into the same device so that the twice NAT can know the respective path identifier without special measures. The disadvantage of this is that off-the-shelf IPSEC and twice NAT devices cannot be used.

Figure 3:
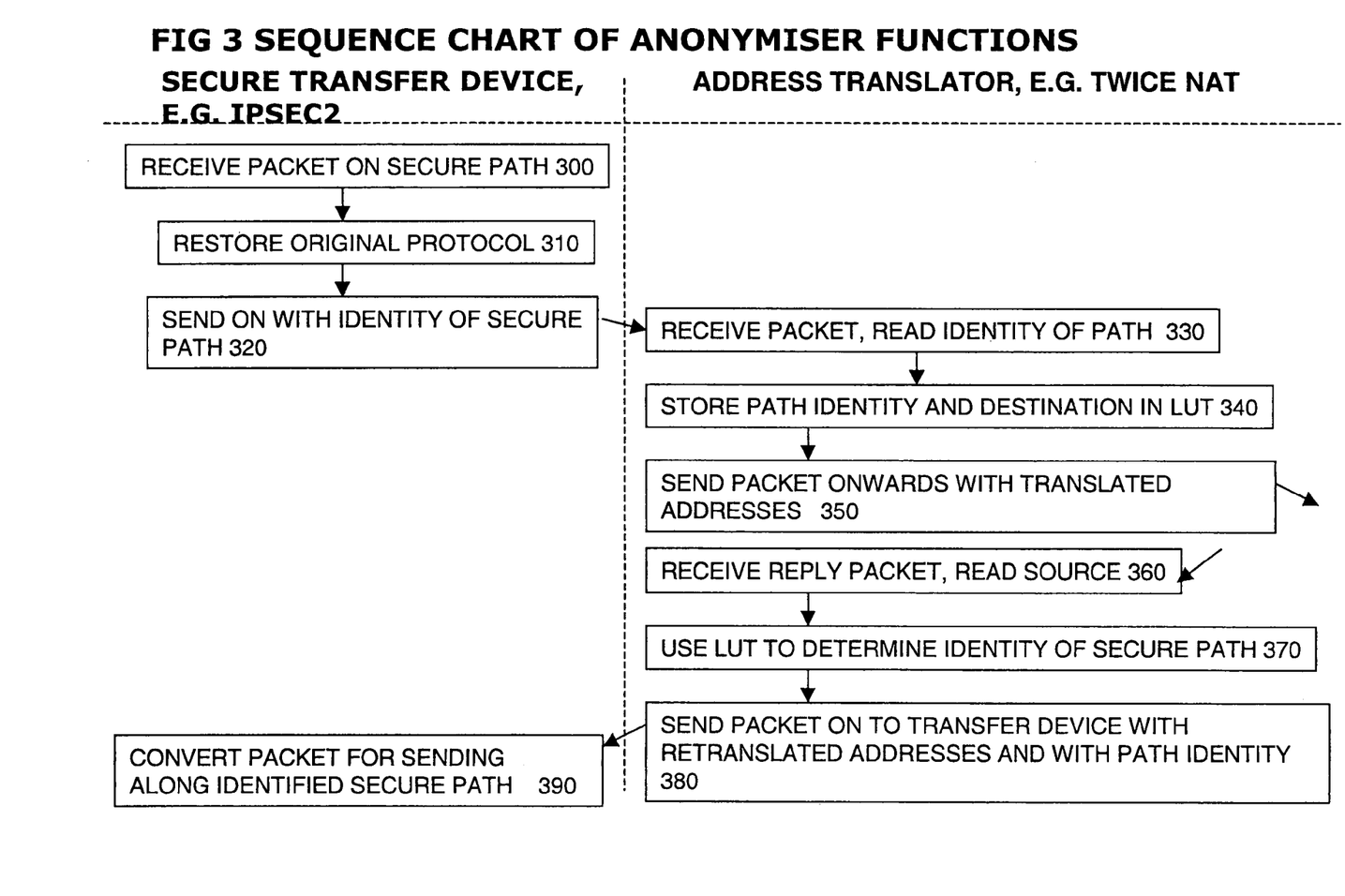
FIG. 3 shows a sequence chart of functions according to an embodiment of the invention.

FIG. 3, Sequence Chart of Anonymiser Functions According to an Embodiment

In FIG. 3, a sequence chart is shown of the functions of a secure transfer device and an address translator in the anonymiser. The secure transfer device can be the IPSEC device shown in FIG. 2, or other devices. The address translator can be the twice NAT device of FIG. 2 or other devices. The functions of the secure transfer device are shown in time order in the left hand column. Those of the address translator are shown in time order in the right hand column. At step 300, the IPsec device receives a packet on the secure path. At step 310 the packet is restored to conform to its original protocol. At step 320 it is sent onwards to the address translator together with an indication of the identity of the path used.

At step 330 the address translator receives the packet and reads the identity of the path. The path identity is stored together with the packet destination in a look up table (LUT) at step 340. At step 350 the packet is sent onwards towards its destination, with its addresses translated. When a reply packet is received, the source address is read at step 360, and the LUT is used to determine the identity of the path at step 370. At 380 the packet is sent onwards to the secure transfer device with retranslated addresses and the path identity. At step 390, the secure transfer device converts the packet for sending along the identified path.

Figure 4:
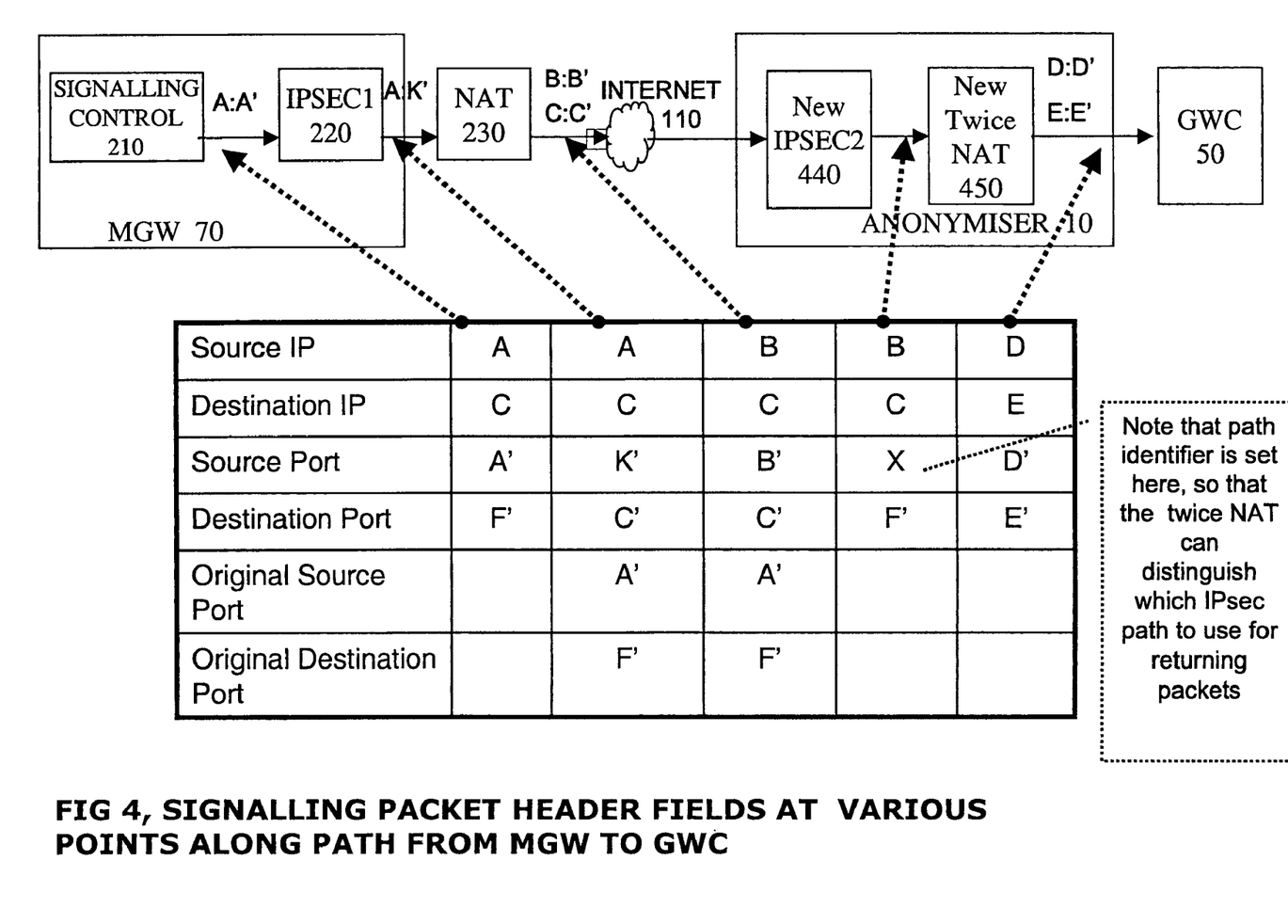
FIG. 4 shows signalling packet header fields at various points, according to an embodiment.

FIG. 4, Packet Flow Path and Signalling Packet Header Fields According to an Embodiment FIG. 4 shows the same path as shown in FIG. 2, and corresponding reference numerals have been used as appropriate. A similar table of signalling packet header fields at various points along the path is also shown. The key difference is in the operation of the IPSEC 2 and the twice NAT. In FIG. 4 there is a new IPSEC 2, 440, which operates to insert the path identifier X into the source port field. There is a new twice NAT 450 which stores the path identifier for use by returning packets of the same flow.

The first packet in a given flow is allocated a given port in the IPSEC device. The same port is then used for subsequent packets in the same direction, and the bind defining the port for a given flow, and thus defining the path, is kept until a timeout. In the anonymiser, the twice NAT has one single public registered IP address and many (hundreds) of port addresses. Since IPv4 addresses are becoming scarce and therefore expensive, this enables a private network to have many separate addresses with a minimum of public registered addresses. Many GWCs can be multiplexed onto different ports of the address space of the twice NAT.

The IPSEC secure path can be implemented as a type of secure path having a security association. The secure transfer devices create a port-to-port bind and enable protocols such as SNMP which normally requires different ports for different directions to be carried even over the same ports in both directions. As discussed above, the IPsec device uses UDP encapsulation of IPSEC in transport mode.

The NAT 230 has the purpose of converting private IP addresses and ports into a public address and port. It allocates ports dynamically for outgoing packets, and stores the correspondence or "bind" for use in retranslating addresses of returning packets.

Figure 5:
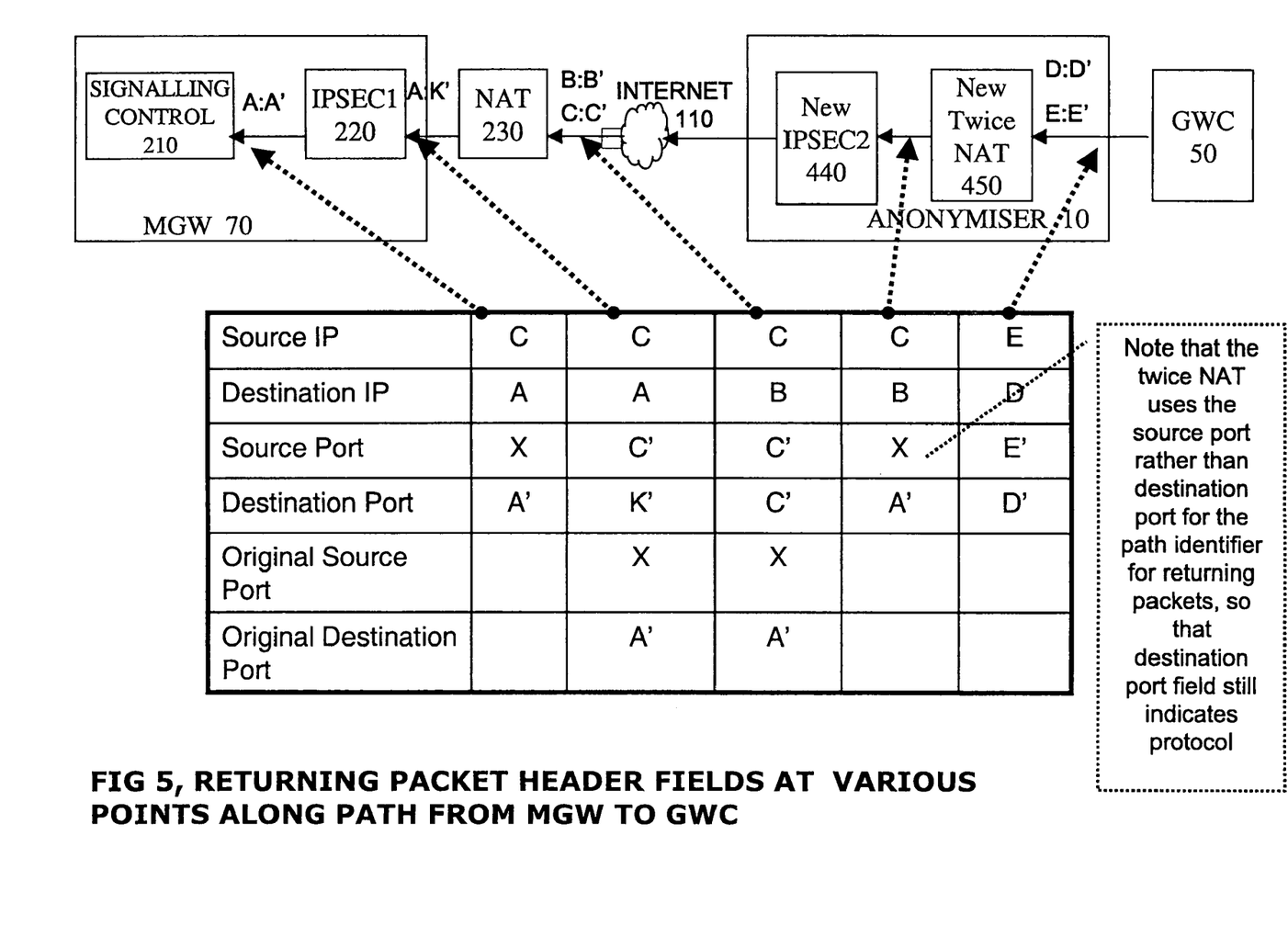
FIG. 5 shows returning packet header fields according to an embodiment.

FIG. 5, Corresponding Path for Return Packets According to an Embodiment

FIG. 5 shows packets returning along the same path. Corresponding numerals have been used as in FIG. 4, as appropriate. In this case, notably the new twice NAT retranslates the source and destination IP addresses using the information stored in the look up table for outgoing packets of the same flow. Normally a conventional twice NAT would be expected to recover the original source port field value X and insert this value into the destination port field of the returning packet, since what was the source for the outgoing packet, becomes the destination of the returning packet. This is an option, but it would result in the IPSEC 1 device misinterpreting this field as reflecting the type of protocol used. This could be overcome in principle by modifying the IPSEC 1 device, but in practice it is preferable to modify the twice NAT device. Accordingly, the new twice NAT device is arranged to use the source port rather than the destination port for the path identifier. This means the destination port field of packets leaving the new twice NAT indicates the protocol, eg SNMP, as before.

This means the retranslation of addresses is not symmetrical, and therefore at least for this field, a separate look up table is used for the respective translations in each direction of flow. The new IPSEC 2, 440, is modified to use the source port field as the path identifier. This identifies uniquely the secure association and so identifies the secure path. This is significant because there can be hundreds or thousands of calls set up by hundreds or thousands of media gateways in one or many private networks coupled via the internet to a given service provider. Reliable setup and monitoring of these calls or other services is essential. For example, billing may be derived from such signalling flows, hence the need for appropriate security measures.

Figure 6:
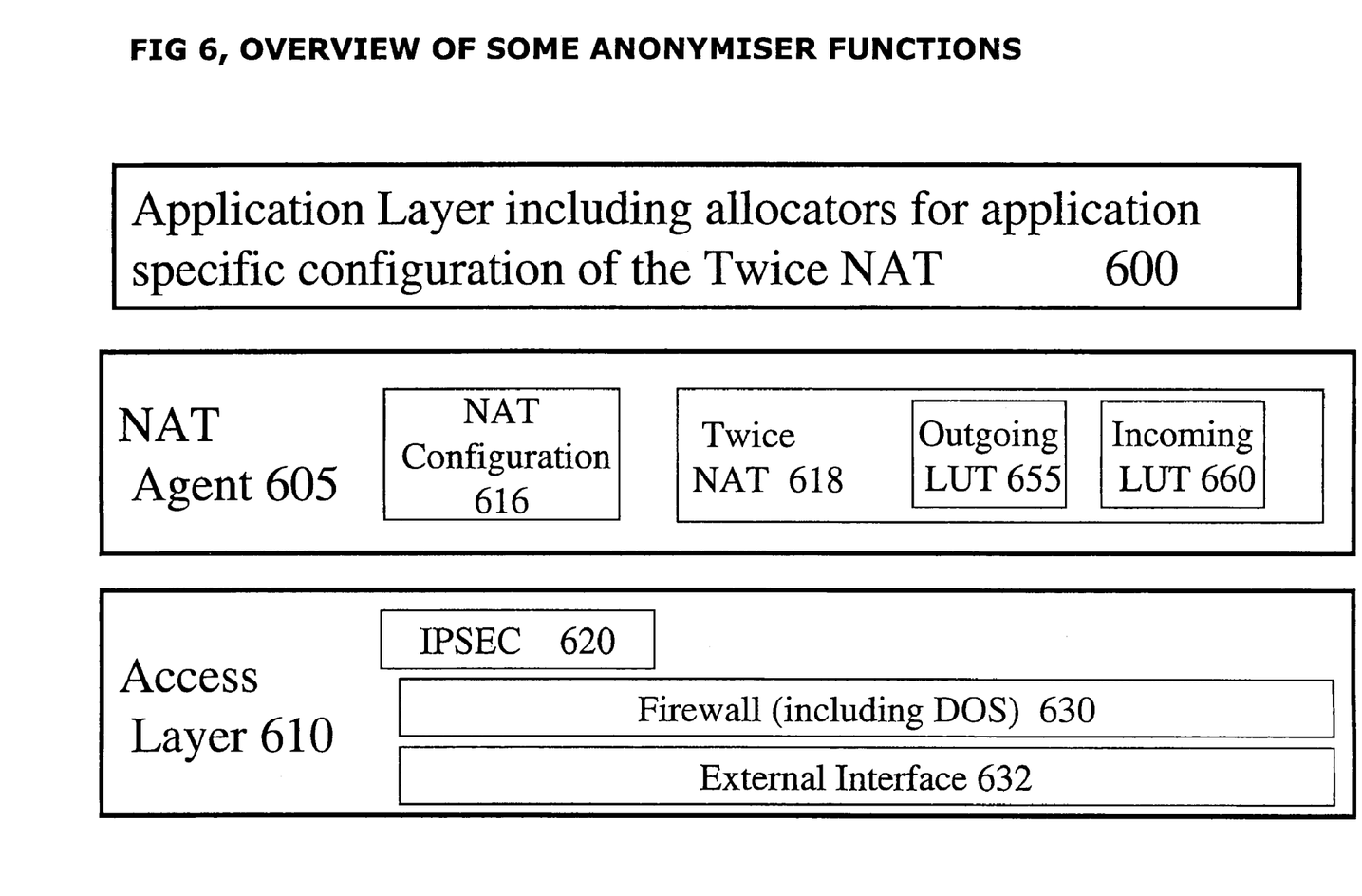
FIG. 6 shows an overview of some anonymiser functions.

FIG. 6, Overview of Functions

FIG. 6 shows an overview of some functions of an anonymiser, set out in layers, and showing how an example of the interface described above is incorporated in the anonymiser. There is an application layer 600, a NAT agent layer 605 and an access layer 610. The various layers can be implemented in software modules executed on conventional hardware which may be distributed at various locations in the network. Each layer depends on and uses layers beneath it. The application layer includes allocators for application specific configuration of the twice NAT. The NAT agent layer includes NAT configuration 616, and twice NAT 618. The twice NAT 618 includes an outgoing LUT 655 and an incoming LUT 660. The access layer 610 includes IPsec processing function 620, a firewall (including DOS) 630, and an external interface 632. Other authentication functions or pass through functions are not illustrated. The IPsec processing function and the Twice NAT together constitute an example of the interface, operating as described above. The outgoing LUT 655 retains a record of the path identifier and destination address for packets received and passed on by the IPsec processing function, and is used to translate their headers. Correspondingly, the incoming LUT 660 retains a similar record and is used for translating the headers of returning packets.

Concluding Remarks

As has been described above an interface for a private IP network interfaces flows of packets between gateway controllers and external media gateways. It has a network address translator and an IPsec device for maintaining secure paths to the external devices. A path identifier records which of the packet flows corresponds to which path. It is incorporated in the packet header, and means that the same interface can be used to couple many different external gateways, and interface them with many of the gateway controllers. Widespread deployment of such interfaces in anonymisers to achieve hiding of device addresses and network topology, as well as the reduction in use of expensive registered addresses is facilitated. By sending the path identifier in the packet, the IPsec device and the address translator can be loosely coupled devices, so standard readily available devices can be used.

Other variations will be apparent to those skilled in the art, having corresponding advantages to those set out above, within the scope of the claims.

The invention claimed is:

1. An interface for a network for interfacing flows of packets between Internet Protocol 'IP' addressable devices in the network and IP addressable devices external to the network, each packet in each flow of packets containing respective fields for a source IP address, a destination IP address, a source port and a destination port, the interface having:
    an address translator coupled to the IP addressable devices for translating addresses of the packets flowing to and from the IP addressable devices,
    a secure transfer device coupled to the address translator for maintaining secure paths for each of the flows of packets to and from the IP addressable external devices, each of said secure paths having a path identifier, the secure transfer device being arranged for each secure path to insert the path identifier for said secure path into the source port field of each packet flowing on said secure path into the secure transfer device, and
    the address translator being arranged to store the path identifiers inserted into said source port fields of said packets flowing into the secure transfer device in order to maintain a record of which of the secure paths corresponds to which of the packet flows.

2. The interface of claim 1, wherein the address translator is further arranged for each secure path to insert the path identifier for said secure path into the source port field of each packet flowing on said secure path away from the address translator.

3. The interface of claim 1, wherein the secure paths are arranged to use UDP encapsulation of IPsec packets.

4. The interface of claim 1, wherein the secure transfer device is arranged to insert the path identifier in the source port field within a header of the packets.

5. The interface of claim 1, wherein the path identifier is inserted into source port fields in return packets arriving at the secure transfer device from the address translator.

6. The interface of claim 1, wherein the secure transfer device is arranged to handle flows having different protocols, and to send an indication of the protocol for each flow.

7. The interface of claim 1, wherein the address translator comprises a twice NAT device.

8. The interface of claim 7, wherein the twice NAT device has separate look up tables for packet flows in each direction.

9. The interface of claim 1, wherein it comprises software.

10. An anonymiser for hiding network addresses, having the interface of claim 1.

11. A network having a number of separate IP addressable devices, and an interface to other networks, and having the interface of claim 1 arranged to hide IP addresses of the IP addressable devices from the other networks.

12. A method of offering a voice over IP communications service using a network having the interface of claim 1.

13. The method of claim 12, wherein the network is a service providers network, and the IP addressable devices are gateway controllers arranged for setting up a VoIP call between the IP addressable devices.

* * * * *